(12) United States Patent
Lupa et al.

(10) Patent No.: US 8,737,741 B2
(45) Date of Patent: May 27, 2014

(54) PROBABILITY OF ACCIDENTAL GARMENT MATCH

(75) Inventors: Robert M. Lupa, Vernon, IL (US);
Victor E. Perlin, Ann Arbor, MI (US);
Norman H. Adams, Fulton, MD (US);
Mitchell M. Rohde, Saline, MI (US)

(73) Assignee: Quantum Signal, LLC, Saline, MI (US)

( * ) Notice: Subject to any disclaimer, the term of this patent is extended or adjusted under 35 U.S.C. 154(b) by 1368 days.

(21) Appl. No.: 12/362,482

(22) Filed: Jan. 29, 2009

(65) Prior Publication Data

US 2011/0178779 A1    Jul. 21, 2011

(51) Int. Cl.
*G06K 9/00* (2006.01)

(52) U.S. Cl.
USPC ........................................................ 382/181

(58) Field of Classification Search
USPC ......... 382/118, 159, 165, 181, 199, 209, 228, 382/311
See application file for complete search history.

(56) References Cited

U.S. PATENT DOCUMENTS

2004/0052418 A1* 3/2004 DeLean .................. 382/209
2011/0262028 A1* 10/2011 Lipson et al. ............ 382/147

OTHER PUBLICATIONS

Olson et al. "An Object Recognition System for Complex Imagery that Models the Probability of a False Positive", 1996, Technical Report, 20 pages.*

Geradts et al., "Pattern Recognition and image processing in forensic science", Proceedings of the Irish Machine Vision and Image processing conference, 2000, 18 pages.*

Yoshizaki, J. "Use of Natural Tags in Closed Population Capture-Recapture Studies: Modeling Misidentification", 2007, Thesis, 178 pages.*

Adams et al. "Upper-Bounding ithe Incidence Rate of Associations Between Camouflage Uniforms and Surveillance Images", Nov. 2009, J. Forensic Science, vol. 54, No. 6, 14 pages.*

* cited by examiner

*Primary Examiner* — Suzanne Lo
(74) *Attorney, Agent, or Firm* — Michael Dryja

(57) ABSTRACT

A digital image of a first garment having one or more first garment portions is received. A user has identified the first garment portions as matching one or more corresponding second garment portions of a second garment. The probability of accidental match of the first garment within the digital image in relation to the second garment is determined, by using a statistical model based on one or more parameters and based on analysis of the first garment portions. The probability of accidental match is output.

22 Claims, 4 Drawing Sheets

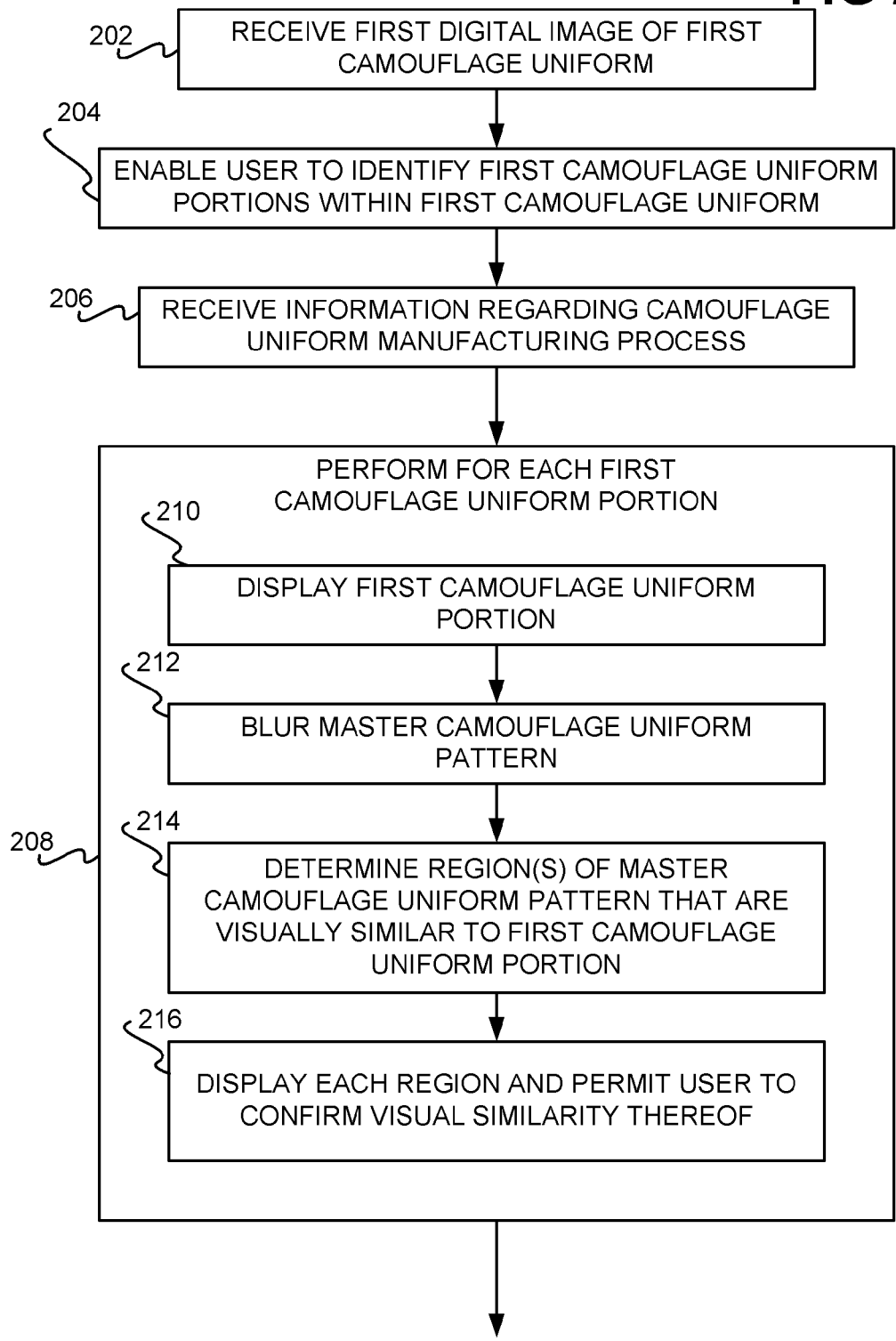

PROBABILITY OF ACCIDENTAL GARMENT MATCH

GOVERNMENTAL RIGHTS IN THE INVENTION

The invention that is the subject of this patent application was made with Government support under Contract No. W91CRB-06-C-0013 awarded by the Department of Defense Combating Terrorism Technology Support Office and the Technical Support Working Group. The Government has certain rights in this invention.

BACKGROUND

Statistical evidence presents a unique challenge in legal proceedings. Statistical evidence can provide weight for the prosecution's claim that a given suspect has committed a particular crime. Of particular concern here are instances in which a forensic examiner, or expert, has established a match between a piece of evidence found at the crime scene and a corresponding piece of evidence directly related to the suspect him or herself—for example, a crime scene image of a perpetrator in a unique set of clothing, and similar if not identical clothing being found to belong to the suspect. Even if such a match is incontrovertible, the match may still be accidental.

Historically, a match is presented only if it could be reasonably assumed that the probability of accidental match is zero. For example, fingerprint evidence would only be admissible if enough features are observed in the crime scene evidence to preclude any individual other than the suspect having left the fingerprints. However, modern forensic science has generally recognized that such certainty can never truly be attained except in a very small number of situations.

In some criminal investigations, critical pieces of evidence include surveillance images showing the perpetrator of a crime wearing clothing that can be matched to clothing worn or owned by a suspect. Experts can, in some cases, find and document matching areas between the clothing depicted in these images to the clothing obtained from the suspect, and this evidence is specific enough so as to constitute proof. These matches, however, can be imperfect for a number of reasons, such as poor surveillance image quality, inherent repetition of the garment manufacturing process leading to garments having similar visual appearance, and so on. Thus, it is important for forensic examiners, judges, juries, and others to understand the quality of the match. Statistically analyzing these garment matches can provide quantitative information on match quality. Unfortunately, general garments are usually highly varied, and in many cases not enough is known about them to estimate meaningful statistics that can be used at trial.

SUMMARY

The present invention relates generally to determining the probability of accidental match in garments, such as in the special case of camouflage garments, and in particular military camouflage uniforms. In criminal cases involving military personnel, the widespread use of standard issue camouflage uniforms, such as the US Army Combat Uniform (ACU), presents a unique context in which statistical garment matching has found to be feasible. In this case, a great deal is known about the garments and the people wearing them. In particular, the garment manufacturing process has been found to be sufficiently standardized that a statistical model has been constructed that accounts for all significant sources of variation within the garment. Embodiments of the present invention employ a novel statistical model that is based on the knowledge of the manufacturing process of camouflage uniforms, which is then employed in conjunction with forensic data to estimate the probability of an accidental camouflage uniform match.

A computer-readable medium of an embodiment of the invention has one or more computer programs stored thereon for executing by one or more computing devices. Execution of the computer programs by the computing devices cause performance of a method. The method receives a digital image of a first garment having one or more first garment portions. A user has identified the first garment portions as matching one or more corresponding second garment portions of a second garment. The method determines the probability of accidental match of the first garment within the digital image in relation to the second garment, by using a statistical model based on one or more parameters and based on analyses of the first garment portions. The method outputs the probability of accidental match.

A system of an embodiment of the invention includes one or more computing devices that include hardware. The hardware is programmed to receive a first digital image of a first camouflage garment. The hardware is programmed to enable a user to identify one or more first camouflage garment portions within the first camouflage garment. The user has identified the first camouflage garment portions as matching one or more corresponding second camouflage garment portions of a second camouflage garment. The hardware is programmed to determine a probability of accidental match of the first camouflage garment in relation to the second camouflage garment, by using a statistical model based on one or more parameters and based on analyses of the first camouflage garment portions. The hardware is further programmed to output the probability of accidental match.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2A and 2B are flowcharts of a method that is more detailed than but consistent with the method of FIG. 1, according to an embodiment of the invention.

DETAILED DESCRIPTION OF THE DRAWINGS

Figure 1:
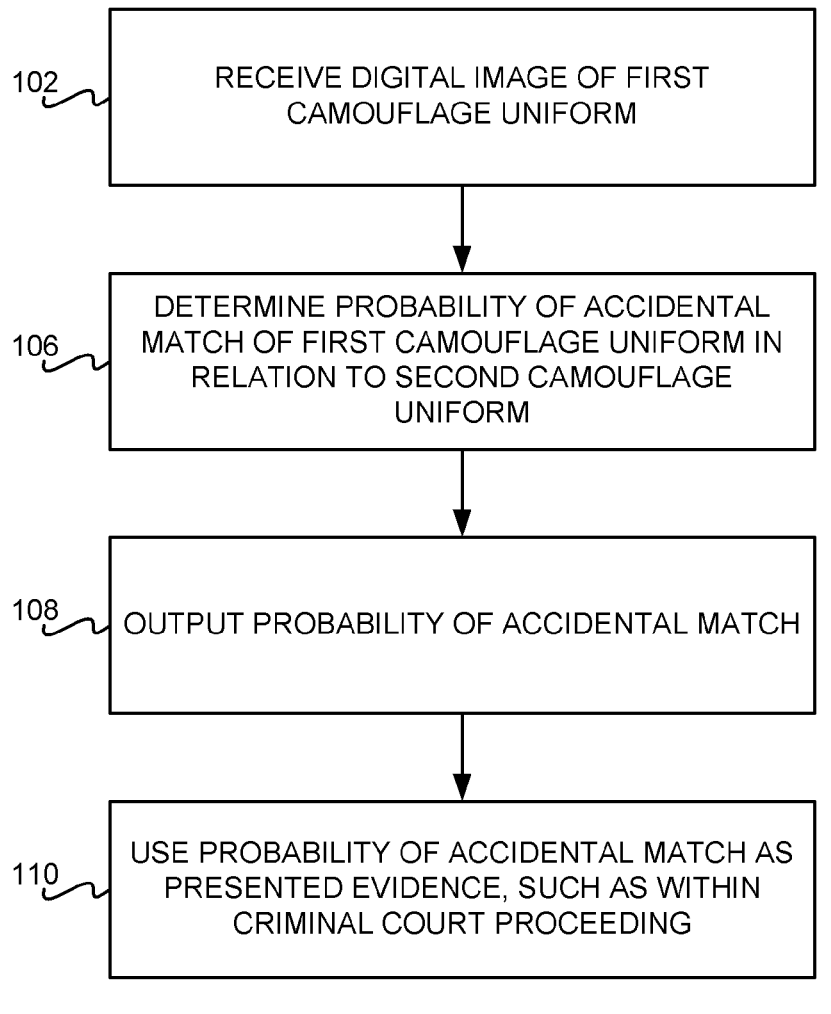
FIG. 1 is a flowchart of a method, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Statistical Model for Determining Accidental Match Probability

In this section of the detailed description, the development of a statistical model for determining the probability of an accidental match between a first camouflage uniform and a second camouflage uniform is described. The statistical model includes a number of parameters. The camouflage uniforms from which the uniform portions are selected or taken are exemplarily described herein as US Army Combat Uniforms (ACU's), but other types of camouflage uniforms are also amenable to embodiments of the invention.

Let $E_C$ be the event that a surveillance image from a crime scene that depicts a camouflage garment, or uniform, matches a camouflage garment, or uniform, seized from a suspect. Matching herein can mean that a forensic examiner, or expert or other user, has established that these two pieces of evidence are compatible. That is, there is agreement between all observable characteristics, and there are no unaccounted-for differences. The likelihood ratio for this match is:

$$LR = \frac{Pr(E_C \mid H_1)}{Pr(E_C \mid H_0)} \quad (1)$$

$H_0$ and $H_1$ are the two hypotheses. Specifically, $H_1$ is the hypothesis that the garment seized from the suspect is the garment depicted in the surveillance image. By comparison, $H_2$ is the hypothesis that the garment seized from the suspect is not the garment depicted in the surveillance image.

As such, $Pr(E_c \mid H_0)$ is the probability, or incidence rate, of a match occurring between the surveillance image and a randomly chosen garment. Stated another way, this probability is the accidental match probability. Addressed herein is the case in which a forensic examiner has already established a match between the two pieces of evidence in question, such that $Pr(E_c \mid H_1) = 1$. Accordingly, the likelihood ratio is the inverse of the incidence rate—that is, the likelihood ratio is the inverse of the accidental match probability.

To determine the accidental match probability—which can include upper-bounding this probability in at least some embodiments—a framework has been developed for piece-by-piece matching of ACU garments. Each ACU garment is constructed from a fixed number of pieces of fabric. The camouflage pattern is the same for all fabric used in ACU garments, and repeats periodically with a period L. Manufacturers of ACU garments may be required to orient the fabric in one of two possible directions for all pieces within the garment, but the portion of camouflage pattern that is visible in each piece is not otherwise specified. As such, two pieces of fabric with the same shape and orientation are identical if a reference point in both pieces is located at the same position in the L-by-L camouflage pattern.

However, in forensic applications just one garment is physically available: the garment (or portions thereof) seized from a suspect. The other garment is depicted in a surveillance image. Surveillance images can be of low resolution, taken under poor lighting conditions, may contain compression artifacts, and depict garments that are wrapped around complex surfaces, such as the human body. As such, the reference points from the same pieces of the two garments may not need to come from exactly the same location in the camouflage pattern for the two pieces to be judged as matching. There exists a range of shifts for each reference point within which a mismatch cannot be detected. The size of this range is defined herein as the uncertainty of the match. This uncertainty depends on the surveillance image, may be different for each observable piece in the image, and must be determined by the forensic examiner.

In addition, two unique pieces may be erroneously judged as identical if they are drawn from distinct locations of the camouflage pattern in which the pattern is similar. Due to the algorithmic nature by which modern camouflage patterns (such as the ACU) is generated, the pattern contains several areas that are very similar, and that are virtually indistinguishable in low-quality images, especially where just certain small areas of the pattern in question are considered. Such similar portions of the pattern are referred to herein as siblings. Some portions of the pattern have many siblings, whereas others do not. For a given match between a piece of the seized garment and a piece depicted in a surveillance image, the number of siblings in the camouflage pattern that would yield the same image is defined as the multiplicity of the match. By definition, the match multiplicity is at least one, and every portion of the camouflage pattern has at least one sibling—i.e., the portion itself. The match multiplicity depends on the size of the observed portion of the pattern, and the image quality. As such, the smaller the portion, the higher the multiplicity, and likewise the poorer the image quality, the higher the multiplicity.

Mathematically, a match between two pieces A and B is expressed as:

$$|x_A - x_B - s_x| < \Delta, |y_A - y_B - s_y| < \Delta, \quad (2)$$

Here, $(x_A, y_A)$ are the coordinates of the reference point of piece A in the camouflage pattern, $(x_B, y_B)$ are the coordinates of the reference point in piece B, $(s_x, s_y)$ are the shifts between the true match location and a sibling, and $\Delta$ is the match uncertainty. It is noted that $(s_x, s_y) = (0, 0)$ for the match at the true match location. The coordinates $(x_A, y_A)$ and $(x_B, y_B)$ are measured within a single period of the camouflage pattern, and the difference operation above operates on a circular space $[0, L)$.

A statistical model for the variables in Equation (2) is now developed. This model is based on the garment manufacturing process, which is initially described. The model depends upon the specific manufacturing parameters for each garment, and in particular if the garments were manufactured from the same marker, and if ply integrity was maintained for both garments.

The ACU garment manufacturing process may be divided into four parts: marking, spreading, cutting, and sewing. Marking is the process of creating a design template for cutting all of the pieces needed for the garment from the camouflage fabric. This template is referred to herein as a marker. Markers usually occupy the full width of the fabric roll, minus a small margin on either side. Markers are designed using manual layout software, automatic layout software, or a combination of both. The principal goal in marker design is to minimize the quantity of scrap fabric, without complicating the cutting process unduly. A marker may be used only once or many times over a period of years. The ACU garments are made from a rip-stop material, as known within the art, and the garment specifications restrict the possible rotations of the pieces within the marker to either one specification orientation, or a 180-degree rotation of that orientation.

Spreading is the process of laying plies of fabric on top of one another. A stack of plies is referred to as a spread. Different manufacturers use different spread thicknesses, from a few dozen to a few hundred plies, as well as different spread lengths, from several to a hundred yards. Typically, several hundred garments are produced from a single spread. Spreading is accomplished either manually or through automated spreading machines. Two methods of spreading are common: single-sided and double-sided. Single-sided spreads have all the plies face one direction (i.e., the camouflage pattern face of each ply faces the same direction). Double-sided spreads have pairs of plies that face each other (i.e., the camouflage pattern faces of two adjacent plies face one another). When spreading has been completed, a marker is placed on top of the spread, and cutting begins.

Cutting can be performed either manually, by a skilled laborer guiding a saw through the plies, or by an automated, computerized cutting machine. In either case, the marker is used as a guide for cutting out stacks of pieces. The garment specifications may dictate that cuts have to be within a small margin of error, such as ⅛ of an inch.

The stacks of pieces are handled with care as they move through the sewing process. To maintain color shading consistency across a given garment, specifications can require ply integrity, which ensures that all the pieces used to make a given garment come from the same ply in the spread. This is followed to varying extents by garment manufacturers.

The stacks move through a factory-style assembly line of sewing stations. Some sewing stations include a conventional sewing machine and an operator, whereas others include elaborate computer-controlled devices that perform one or more alignments, stitches, and/or folds. Manufacturing facilities have varying levels of automation, with some being almost entirely manual and others being almost entirely automatic.

Piece-, or portion-, wise garment matches are determined mathematically by the reference coordinates with respect to the camouflage pattern. Therefore, a statistical characterization of the coordinates is required to estimate the incident rate. $(x_i, y_i)$ are the longitudinal (along the spread) and transverse (across the spread) coordinates of the position in the camouflage pattern of a reference point for piece or portion i. These coordinates can be expressed as:

$$x_i = x_M + x_{M,i} + x_{cs,i}$$

$$y_i = y_M + y_{M,i} + y_{cs,i} \quad (3)$$

Here, $(x_M, y_M)$ are the coordinates of the marker with respect to the camouflage pattern, $(x_{Mi}, y_{Mi})$ are the coordinates of the i-th piece within the marker, and $(x_{cs,i}, y_{cs,i})$ are the combined cutting and stitching errors. The cutting and stitching errors are defined as the deviations of the reference position from the nominal due to imperfections in the cutting and stitching processes. These errors are explicitly limited to a small range by the garment specification, such as less than ⅛ of an inch.

Each ply of a spread can begin at any point in the period L. As such, the longitudinal coordinate of the marker $x_M$ is unrestricted and can assume any value in the [0, L) interval with uniform probability. By contrast, the transverse coordinate $y_M$ ideally should be a constant for all plies in the spread. However, in practice there are two factors that cause variation of $y_M$ within a narrow range. First, the camouflage pattern tends to drift transversely—i.e., the fabric edge corresponds to different points of the pattern at different locations along the length of the roll. Second, the fabric also tends to drift transversely as it is spread—i.e., the edges of the spread fabric are not straight and do not align perfectly from ply to ply. The former factor is determined by the fabric manufacturer. The latter factor is determining by the spreading process, and its magnitude varies significantly between manufacturers.

Accurate statistical characterization of the coordinates $(x_M, y_M)$ is important within the statistical matching model. As such, a method of direct sampling of spreads to estimate the probability distribution functions (PDF's) of $(x_M, y_M)$ for manufacturers is developed. The method is based on collecting and analyzing fabric pieces cut from the spread during the manufacturing process. Every marker contains unused areas that produce scrap stacks, which are typically discarded by the manufacturer. For instance, numerous full scrap stacks may be collected from several manufacturers. All pieces in each scrap stack are then scanned, automatically aligned, and located within the camouflage pattern based on the cross-correlation surface.

For all the pieces in a certain scrap stack, the second and third terms of Equation (3) are the same, and the variation in their coordinates is solely due to distribution of the marker coordinates $(x_M, y_M)$. Accordingly, given large enough sample sets, the probability distributes for $x_M$ and $y_M$ are found by constructing empirical histograms. Histograms for individual stacks are combined to provide a single aggregate histogram for each manufacturer. For the longitudinal direction, individual stack histograms are combined directly, whereas for the transverse direction the mean of each stack is subtracted prior to combining the histograms. It has been found that the longitudinal distribution is approximately uniform, and the transverse distribution is approximately normal. The standard deviation of the transverse distribution has been found to vary significantly between manufacturers.

In addition to the marker coordinate distributions, the dependence of the coordinates between plies is important for garment matching. It has been found that, in general, plies are independent, such that knowing $(x_M, y_M)$ for a given ply does not provide any information regarding another, randomly chosen ply. However, this is not the case for adjacent plies, which is relevant for double-sided spreading, in which the pieces of the same garment often come from adjacent plies. Dependence between adjacent plies is described by the condition PDF's, $Pr(x_{M,k}|x_{M,k-1})$ and $Pr(y_{M,k}|y_{M,k-1})$.

For the longitudinal direction, the conditional distribution is equivalent (same shape, different mean) to the distribution of the difference $(x_{M,k} - x_{M,k-1})$, which is independent of $x_{M,k-1}$:

$$Pr(x_{M,k}|x_{M,k-1}) \sim Pr(x_{M,k} - x_{M,k-1}|x_{M,k-1}) = Pr(x_{M,k} - x_{M,k-1}) \quad (4)$$

The PDF on the right side of Equation (4) is estimated from the scrap stacks. If the fabric in the spread is laid continuously from the same roll, the distribution acquires a Gaussian shape, as the length of each ply is approximately constant. If there is a splice point, due to a change of fabric rolls, or any other irregularity, then the coordinates $x_{M,k}$ and $x_{M,k-1}$ become decoupled, which corresponds to uniform distribution tails. However, the frequency of these irregularities is dependent upon varying manufacturer practices, and is difficult to characterize. As such, it is presumed herein that there are no such irregularities in the spread, which narrows the distribution and increases the probability of an accidental match:

$$Pr(x_{M,k}|x_{M,k-1}) \approx N(\mu, \sigma_{CL}^2), \mu = x_{M,k-1} + \text{const} \quad (5)$$

Transverse marker coordinates in adjacent plies $y_{M,k}$ and $y_{M,k-1}$ are also highly dependent. Assuming that they conform to a joint Gaussian distribution, the conditional PDF $Pr(y_{M,k}|y_{M,k-1})$ is obtained, which is also Gaussian, with non-zero mean and reduced variance:

$$Pr(y_{M,k}|y_{M,k-1}) \sim N(\mu, \sigma_{CT}^2), \mu = y_{M,k-1} r, \sigma_{CT}^2 = \sigma_T^2(1-r^2) \quad (6)$$

Except for the term $(x_M, y_M)$, all of the terms are unique for each piece within a garment. By contrast, the term $(x_M, y_M)$ is often, but not always, constant for all pieces within the garment. Indeed, $(x_M, y_M)$ is the same for all pieces within a garment if and only if ply integrity is maintained for that garment. If two pieces come from different plies, then each piece will have a different $(x_M, y_M)$ term. As such, knowledge of whether or not ply integrity was maintained is important for determining the probability of an accidental match, as each independent $(x_M, y_M)$ term reduces the probability by more than an order of magnitude. Poor ply integrity greatly decreases the accidental match probability. However, because an upper-bound to the probability of an accidental match is sought by the overall estimation process, strict ply integrity is presumed unless otherwise is known.

The cutting and stitching errors are difficult to measure non-invasively within a real-world environment (wherein substantial manual processes are used), such that empirical characterization is nearly impossible. The garment specifications limit the range of allowed cutting and stitching errors to about ⅛ of an inch each, and it is reasonable to assume that these error distributions are normal. As such, the cutting and stitching errors are combined into a single Gaussian random variable with the standard deviation supplied by the user. Forensic examiners typically will use a conservative, small value, unless they have specific evidence to the contrary. In all cases, the cutting and stitching error distribution is narrow compared to the distributions that have been described above, and has little influence on the incidence rate.

The position of each piece within the marker $(x_{M,i}, y_{M,i})$ is another potential source of variation, but just in some situations. If the markers used to make the two garments are independent, then the difference between the corresponding $(x_{M,i}, y_{M,i})$ coordinates are uniformly distributed on $[0 \ldots L) \times [0 \ldots L)$, independently for each piece. However, if the two garments are made from the same marker, then the $(x_{M,i}, y_{M,i})$ coordinates are the same and cancel one another in Equation (2). In this situation, if any one piece matches between the two garments, and ply integrity was maintained for both garments, then it is likely that all other pieces will also match.

Between the boundary cases of completely independent markers and identical markers is the case of similar markers, in which some of the pieces have the same relative positions. The statistics of similar markers are difficult to characterize, and such a characterization would require access to a large number of sample markers, which manufacturers are reluctant to release for competitive reasons. To maintain a conservative upper bound on the incidence rate, similar markers thus have to be treated as identical.

The probability that two garments were made from the same marker is difficult to estimate. ACU manufacturers continuously discard and redesign their markers, while reusing some markers many times. Hence, some markers may have been used for thousands of garments, whereas others may have been used for only a few dozen garments. Manufacturer records describing the use of markers are not always kept, and thus cannot be assumed to be accessible or even exist. Nevertheless, if the probability that the two garments were made from the same marker was known to be $P_1$, then it may be incorporated into the incidence rate determination:

$$Pr(\text{match}) = Pr(\text{match}|\text{identical markers})P_1 + Pr(\text{match}|\text{independent markers})(1-P_1) \quad (7)$$

In some cases it may be impossible to estimate $P_1$, and the forensic examiner must assume the worst case, that $P_1=1$. Overall, however, it has been found that it is unlikely that two markers designed by different manufacturers are similar. This is because different manufacturers use different spread lengths and fabric widths. Many manufacturers design larger markers which contain the pieces for multiple garments. In this case, the number of possible arrangements becomes so large that the probability of similar markers becomes negligible, even for just a few pieces. A reasonable rule of thumb for upper bounding the incidence rate (i.e., the accidental match probability) is to assume identical markers for all garments made by the same manufacturer and independent markers for garments made by different manufacturers.

It is supposed that an n-piece match has been identified between a garment depicted in a surveillance image (garment A) and a garment seized from a suspect (garment B). An upper bound on the probability that this match has occurred accidentally is sought. The two sets of evidence are used to estimate a few parameters for each piece $i=1 \ldots n$, including the uncertainty $\Delta_i$, and the multiplicity $m_i$. The overall match is described as:

$$\forall i=1 \ldots n \; \exists j \in \{1 \ldots m\}: |x_{i,A} - x_{i,B} - s_{x,i,j}| < \Delta_i, |y_{i,A} - y_{i,B} - s_{y,i,j}| < \Delta_i, \quad (8)$$

It is noted that the match is separated into longitudinal and transverse directions. This is tantamount to a square matching area, with sides of length $2\Delta_i$. Ideally, a circular matching area with radius $\Delta_i$ may be desirable, but this would complicate the calculation significantly with little extra knowledge gained. Because an upper bound to the match probability is being determined, the larger square matching area is consistent with the desired bound. The statistical characterization above reveals that the longitudinal and transverse coordinates can reasonably be modeled as independent, hence the probability calculation is separable:

$$Pr(A \text{ and } B \text{ match}) = Pr(A \text{ and } B \text{ match longitudinally}) \cdot Pr(A \text{ and } B \text{ match transversely}) \quad (9)$$

For the probability calculation, the coordinates above are broken into individual constituents, as in Equation (3), and treated as random variables. The distributions of each random variable are summarized as follows. The following difference random variables are defined as:

$$\Delta x_M = x_{M,A} - x_{M,B}, \Delta y_M = y_{M,A} - y_{M,B},$$

$$\Delta x_{M,i} = x_{M,i,A} - x_{M,i,B}, \Delta y_{M,i} = y_{M,i,A} - y_{M,i,B},$$

$$\Delta x_{cs,i} = x_{cs,i,A} - x_{cs,i,B}, \Delta y_{cs,i} = y_{cs,i,A} - y_{cs,i,B} \quad (10)$$

Cutting and stitching errors are independent from one another, and independent for each piece in each garment. Accordingly, if each is modeled as Gaussian, then their linear combination is also Gaussian:

$$\Delta x_{cs,i} \sim N(0, \sigma_{cs}^2), \Delta y_{cs,i} \sim N(0, \sigma_{cs}^2), \sigma_{cs}^2 = \sigma_{cs,A}^2 + \sigma_{cs,B}^2 \quad (11)$$

Because the longitudinal coordinates are uniformly distributed in the $[0 \ldots L)$ periodic pattern, their difference $\Delta x_M$ is also uniformly distributed over the same interval. The transverse coordinates are normally distributed, hence their difference is also normal, with double variance:

$$\Delta x_M \sim U(0,L), \Delta y_M \sim N(0, 2\sigma_T^2) \quad (12)$$

The piece coordinate differences within each marker $(\Delta x_{M,i}, \Delta y_{M,i})$ are treated differently depending upon whether the markers are assumed to be independent or identical, where similar markers are treated as identical so as to satisfy the upper bound. For the independent marker case, these random variables are uniform on the interval $[0 \ldots L)$. For the identical marker case, these terms become zero. The independent marker case is first described now, followed by description of the identical marker case.

If the markers used to make garments A and B are independent, then the piece coordinate differences $(\Delta x_{M,i}, \Delta y_{M,i})$ are also independently and uniformly distributed over the pattern period. In this case, the $(\Delta x_{M,i}, \Delta y_{M,i})$ random variables subsume the other coordinate variables, and the overall coordinate differences are independent and uniform:

$$\forall i=1\ldots n \exists j=1\ldots m_i: \Delta x_{i,AB}=x_{i,A}-x_{i,B}=\Delta x_M+\Delta x_{M,i}+\Delta x_{cs,i}\sim U(0,L),$$

$$\Delta y_{i,AB}=y_{i,A}-y_{i,B}=\Delta y_M+\Delta y_{M,i}+\Delta y_{cs,i}\sim U(0,L) \quad (13)$$

The probability of a match becomes the product of the probability for each piece individually, and can be separated into longitudinal and transverse components. The collection of $m_i$ siblings where a match can occur are never close to one another (within one to two inches), such that for each piece the $m_i$ potential matches within the pattern are mutually exclusive events, and their probabilities are simply summed. Thus, the probability is:

$$Pr(\text{match} \mid \text{independent markers}) = Pr(\forall\ i=1\ldots n \quad (14)$$

$$\exists j \in \{1\ldots m_i\}: |\Delta x_{i,AB}-s_{x,i,j}|<\Delta_i, |\Delta y_{i,AB}-s_{y,i,j}|<\Delta) =$$

$$\prod_{i=1\ldots n}\sum_{j=1\ldots m_i}\frac{Pr(|\Delta x_{i,AB}-s_{x,i,j}|<\Delta)\cdot Pr(|\Delta y_{i,AB}-s_{y,i,j}|<\Delta_i)}{2\Delta_i/L \cdot 2\Delta_i/L} =$$

$$\prod_{i=1\ldots n}\frac{4m_i\Delta_i^2}{L^2}$$

For typical values of the match uncertainty $\Delta_i \sim 0.5$ inches and pattern period $L \sim 34$ inches, the probability of match for each piece is on the order of $\sim 0.001$. Hence, in the case of independent markers, the chance of a match for more than one or two pieces is extremely low. By contrast, match probabilities are not as low in the identical marker case, which is now described.

If garments A and B were manufactured from the same marker, then the piece coordinate differences ($\Delta x_{M,i}$, $\Delta y_{M,i}$) are zero. Furthermore, for all pieces that come from the same ply in the spread, the marker coordinate differences ($\Delta x_M$, $\Delta y_M$) are identical, and the overall coordinate differences for each piece ($\Delta x_i$, $\Delta y_i$) are highly correlated. By contrast, each piece for which ply integrity is not maintained has an independent ($\Delta x_M$, $\Delta y_M$) term. Accordingly, the probability of the overall garment match can be separated into the probability that all pieces with ply integrity match and the probability that each piece without ply integrity matches:

$$Pr(\text{all pieces match}) = \quad (15)$$

$$Pr(\text{all PI pieces match})\cdot \prod_{i\in NPI} Pr(i-\text{th piece matches})$$

PI denotes the subset of pieces that are manufactured with ply integrity, and NPI denotes the subset without ply integrity.

The pieces without ply integrity are considered first. Each piece is independent of the others, and the longitudinal and transverse directions for each piece are separable. Because $\Delta x_M$ is uniformly distributed, the longitudinal component of the probability is independent of $s_{x,i,j}$. Using Bayes' Law, the match probability is expressed as:

$$Pr(i\text{-th NPI piece matches}) = \sum_{j=1}^{m_i} Pr(|\Delta x_M + \Delta x_{cs,i} - s_{x,i,j}|<\Delta_i)\cdot \quad (16)$$

$$Pr(|\Delta y_M + \Delta y_{cs,i} - s_{y,i,j}|<\Delta_i)$$

-continued $$= \sum_{j=1}^{m_i}\left(\begin{array}{c}\int Pr\left(\left|\begin{array}{c}\Delta x_M +\\ \Delta x_{cs,i}-\\ s_{x,i,j}\end{array}\right|<\Delta_i \mid \Delta x_M\right)\\ Pr(\Delta x_M)d\Delta x_M\cdot\\ \int Pr\left(\left|\begin{array}{c}\Delta y_M +\\ \Delta y_{cs,i}-\\ s_{y,i,j}\end{array}\right|<\Delta_i\mid \Delta y_M\right)\\ Pr(\Delta y_M)d\Delta y_M\end{array}\right)$$

$$= \int Pr(|\Delta x_M+\Delta x_{cs,i}-s_{x,i,j}|<\Delta_i \mid \Delta x_M)$$

$$Pr(\Delta x_M)d\Delta x_M\cdot$$

$$\sum_{j=1}^{m_i}\int Pr\left(\left|\begin{array}{c}\Delta y_M+\\ \Delta y_{cs,i}-\\ s_{y,i,j}\end{array}\right|<\Delta_i\mid \Delta y_M\right)$$

$$Pr(\Delta y_M)d\Delta y_M$$

To evaluate this integral, $Pr(|\Delta x_M+\Delta x_{cs,i}-s_{x,i,j}|<\Delta_i|\Delta x_M)$ is computed numerically by integrating over a portion of a Gaussian curve (the PDF of $\Delta x_{cs,i}$), or by using the well-known Error Function:

$$Pr(|\Delta x_M+\Delta x_{cs,i}-s_{x,i,j}|<\Delta_i\mid \Delta x_M) = Pr\left(\begin{array}{c}-\Delta_i-\Delta x_M+\\ s_{x,i,j}<\Delta x_{cs,i}<\Delta_i-\\ \Delta x_M+s_{x,i,j}\end{array}\middle|\Delta x_M\right) \quad (17)$$

$$= CDF_N\left(\frac{\Delta_i-\Delta x_M+s_{x,i,j}}{\sigma_{cs}}\right)-$$

$$CDF_N\left(\frac{-\Delta_i-\Delta x_M+s_{x,i,j}}{\sigma_{cs}}\right)$$

This applies to the transverse direction as well.

A simple upper-bound may be used to reduce the number of numerical integrations per NPI piece from $m_i$ to 1. Consider the bottom integral over $\Delta y_M$ in Equation (16). The two Pr( . . . ) terms under this integral are smooth, positive, and symmetric functions of $\Delta y_M$ with single maxima: at $\Delta y_M = s_{y,i,j}$ for $Pr(|\Delta y_M+\Delta y_{cs,i}-s_{y,i,j}|<\Delta_i|\Delta y_M)$ and at $\Delta y_M=0$ for $Pr(\Delta y_M)$.

Following this observation, the integral over $\Delta y_M$ has the highest value when $s_{y,i,j}=0$ and decreases monotonically with increasing $|s_{y,i,j}|$. This implies that each spurious match (due to a sibling) contributes no more to the match probability than the true match at $(s_{x,i,j}, s_{y,i,j})=(0, 0)$. With typical parameter values the probability becomes negligible if $s_{y,i,j}$ exceeds one or two inches. The probability of a match for the i-th NPI piece can therefore be upper-bounded by computing the probability assuming that $m_i=1$, and then multiplying this probability by the number of siblings within a small transverse shift $|s_{y,i,j}|<2(\Delta_i\sigma_T+\sigma_{cs})$, which is defined as the reduced multiplicity of the match $m_{i,0}\le m_i$. Therefore, $$Pr(i\text{-th NPI piece matches})\le m_{i,0}\cdot Pr(i\text{-th NPI piece matches}|m_i=1) \quad (18)$$

The pieces with ply integrity are now considered. Their coordinate differences are dependent through the common marker coordinate differences ($\Delta x_M$, $\Delta y_M$), but they are conditionally independent given $\Delta x_M$ and $\Delta y_M$. As such, the probability of all PI pieces matching is as follows:

$$Pr(\text{all } PI \text{ pieces match}) = \qquad (19)$$

$$\int\int\prod_{i\in PI} Pr\left(\exists j \in \{1 \ldots m_i\} : \begin{array}{l} |\Delta x_M + \Delta x_{cs} - s_{x,i,j}| < \Delta_i \\ |\Delta y_M + \Delta y_{cs} - s_{y,i,j}| < \Delta_i \end{array} \middle| \Delta x_M, \right.$$

$$\left.\Delta y_M\right) Pr(\Delta x_M) Pr(\Delta y_M) d\Delta x_M d\Delta y_M =$$

$$\int\int\prod_{i\in PI}\left(\sum_{j=1}^{m_i} Pr\left(\begin{array}{l} |\Delta x_M + \Delta x_{cs} - s_{x,i,j}| < \Delta_i \\ |\Delta y_M + \Delta y_{cs} - s_{y,i,j}| < \Delta_i \end{array} \middle| \Delta x_M, \Delta y_M\right)\right)$$

$$Pr(\Delta x_M) Pr(\Delta y_M) d\Delta x_M d\Delta y_M$$

The summation over $m_i$ in the bottom line of Equation (19) can be replaced with a simple upper bound using a similar argument to the NPI case described above, with one additional constraint. Because all pieces with ply integrity share the same marker shift, $(\Delta x_M, \Delta y_M)$, all PI pieces match compatible siblings simultaneously. The true match locations guarantee at least one set of compatible siblings, at $s_{(x,y),i,j=1} = (0,0)$ for all i. Any other set of siblings has to satisfy $\forall i, \exists j \in \{1 \ldots m_i\}$: $s_{x,i,j} \approx s_x$. Accordingly, $m_O$ is set as the compatible multiplicity of the PI pieces: $\forall i \in PI \forall j \in (1 \ldots m_O)$: $|s_{x,i,j} - s_{x,j}| < 2(\Delta_i + \sigma_T + \sigma_{cs}) \cap |s_{y,i,j}| < 2(\Delta_i + \sigma_T + \sigma_{cs})$. The probability that all PI pieces match is bounded by the product of the match probability assuming the multiplicity of each piece is one and the compatible multiplicity:

$$Pr(\text{all PI pieces matches}) \leq m_O \cdot Pr(\text{all PI pieces matches} | \forall i \in PI : m_i = 1) \qquad (20)$$

Using the bound in Equation (20), the longitudinal and transverse directions are again independent and the two-dimensional integral in Equation (19) can be replaced with the product of two one-dimensional integrals. In practice, $m_O$ is virtually always one if multiple PI pieces are observed. In this case, the probability calculation is further simplified as:

$$Pr(\text{all } PI \text{ pieces match}) = \qquad (21)$$

$$\int\prod_{i\in PI} Pr(|\Delta x_M + \Delta x_{cs}| < \Delta_i | \Delta x_M) Pr(\Delta x_M) d\Delta x_M \cdot$$

$$\int\prod_{i\in PI} Pr(|\Delta y_M + \Delta y_{cs}| < \Delta_i | \Delta y_M) Pr(\Delta y_M) d\Delta y_M$$

The calculation that has been described above assumes single-sided spreading. If double-sided spreading is employed, an additional source of variation is introduced into the model and the probability of accidental match may be reduced. The mode of spreading affects the probability of accidental match only in the case that ply integrity is maintained and identical markers are used. Thus, the following description considers only PI pieces and identical markers. Furthermore, because double-sided spreading is only relevant in cases in which multiple PI pieces are observed, the probability that $m_O > 1$ is negligible. The description below is valid for $m_O = 1$. However, the approach can be generalized for $m_O > 1$ if desired.

When double-sided spreading is used, the pieces of each garment come from two adjacent plies in the spread, which are referred to as the upper and lower plies. Accordingly, there are now two pairs of marker shift differences instead of one pair: $(\Delta x_{M,u}, \Delta y_{M,u})$ and $(\Delta x_{M,l}, \Delta y_{M,l})$. These two pairs of differences are highly correlated. Conditioning the upper ply differences on the lower ply differences:

$$Pr(\Delta x_{M,u} | \Delta x_{M,l}) \sim N(\Delta x_{M,l}, 2\sigma_{CL}^2)$$

$$Pr(\Delta y_{M,u} | \Delta y_{M,l}) \sim N(r\Delta y_{M,l}, 2\sigma_{CT}^2) \qquad (22)$$

Because $m_O = 1$, the longitudinal and transverse directions can be separated. Considering just the longitudinal component, the probability is:

$$Pr(\text{all pieces match}) = \int Pr(\text{all pieces match} | \Delta x_{M,l}) \qquad (23)$$

$$Pr(\Delta x_{M,l}) d\Delta x_{M,l}$$

$$= \int Pr(\text{upper pieces match} | \Delta x_{M,l})$$

$$Pr(\text{lower pieces match} | \Delta x_{M,l})$$

$$Pr(\Delta x_{M,l}) d\Delta x_{M,l}$$

Once the upper and low plies have been decoupled, the match probability for the lower pieces is similar to the single-sided PI case, and the match probability for the upper pieces is expressed as:

$$Pr(\text{upper pieces match} | \Delta x_{M,l}) = \qquad (24)$$

$$\int\prod_{i\in upperply} Pr(|\Delta x_{M,u} + \Delta x_{cs,i}| < \Delta_i | \Delta x_{M,u}, \Delta x_{M,l})$$

$$Pr(\Delta x_{M,u} | \Delta x_{M,l}) d\Delta x_{M,u}$$

In this situation, a two-dimensional integral is needed, as the shift differences have to be integrated for both the upper and lower plies. However, numerical evaluation of such integrals is relatively straightforward.

It is noted that in order to evaluate Equation (23), it has to be known whether each piece came from the upper or lower ply. Unless the specific marker used to manufacturer the garment is available—which is unlikely—it is typically impossible to know which ply each piece came from. If two mirror symmetric pieces are observed, such as left and right trouser legs, then it may be reasonable to assume that one comes from the upper ply and the other from the lower ply. For other pieces, the ply is modeled as an unknown variable, the probability determined for every valid combination of upper and lower plies, and then averaged. Because this iterative process may be slow, to maintain a valid upper-bound on the match probability it may be preferred to assume that all pieces come from the same ply, such that the probability reverse to the single-sided case that has been described above.

Methods Employing Statistical Model for Determining Accidental Match Probability In this section of the detailed description, various methods are described that employ a statistical model for determining accidental match probability of a first camouflage uniform, such as a US Army camouflage uniform (ACU), to a second camouflage uniform, which also may be an ACU. The statistical model that is employed in these methods may be the statistical model that has been described in the previous section of the detailed description. Furthermore, the methods may be implemented as or by one or more computer programs that are stored on a computer-readable medium, such as a tangible computer-readable medium like a recordable data storage medium. The computer programs are thus executable by one or more processors of one or more computing devices.

FIG. 1 shows a general method 100, according to an embodiment of the invention. The method 100 may be implemented as one or more computer programs that upon execution perform the method 100. These computer programs may be stored on computer-readable media, such as recordable data storage media.

A digital image of a first camouflage uniform is received (102). For instance, the first digital image may be taken at a crime scene in which a perpetrator of a crime wore the first camouflage uniform. The first digital image is received from a digital imaging device. For instance, the digital imaging device may be a digital camera device that is capable of taking digital photos, or a scanning device that is able to generate a digital version of a film-based photo, as can be appreciated by those of ordinary skill within the art. It may also be a still captured from a digital or analog surveillance video or similar.

The first camouflage uniform includes one or more first camouflage uniform portions, which a user has identified as matching one or more corresponding second camouflage uniform portions of a second camouflage uniform. The user may be an expert user in camouflage uniform portion matching, such as a forensic investigator. The second camouflage uniform is that which has been taken from a suspect of the crime.

The method 100 determines a probability that the first camouflage uniform accidentally matches the second camouflage uniform (106). In one embodiment, determining this probability specifically means that the upper-bound of the probability that the first camouflage uniform accidentally matches the second camouflage uniform. For example, if the upper-bound is 10%, then this means that the probability that the first camouflage uniform accidentally matches the second camouflage uniform is no greater than 10%, and may be less. That there is a probability that the first camouflage uniform accidentally matches the second camouflage uniform means that, even though the user has matched the second camouflage uniform portions to the first camouflage uniform portions, there is nevertheless a probability that the camouflage uniform in the first digital image is not the camouflage uniform seized from the suspect.

The probability of accidental match is determined in part 106 of the method 100 by using a statistical model, such as the statistical model described in the previous section of the detailed description. Using the statistical model includes employing one or more parameters and analyses of the identified first camouflage uniform portions. Such parameters can include those that have been at least implicitly referenced in the previous section of the detailed description, for instance, and such analyses have also been exemplary described above. However, some specific exemplary parameters are now presented.

One such parameter is a supposition that the camouflage uniform that includes the first camouflage uniform portion and the camouflage uniform that includes the second camouflage uniform portion have been manufactured using the same camouflage uniform design template, or marker. That is, the same marker has been used to guide cutting of raw camouflage fabric, which was then sewn together to make the camouflage uniforms in question. This parameter has been described in detail in the previous section of the detailed description, and has been referenced as identical markers.

By comparison, a second parameter is a supposition that the camouflage uniform including the first camouflage uniform portion and the camouflage uniform including the second camouflage uniform portion have been manufactured using difference camouflage uniform design templates, or markers. That is, different markers have been used to guide cutting of raw camouflage fabric that was then sewn together to make the camouflage uniforms in question. This parameter also has been described in detail in the previous section of the detailed description, and has been referenced as independent markers. It is noted that the first parameter is mutually exclusive with the second parameter, such that either the first parameter is employed, or the second parameter is employed.

A third parameter is a supposition that the camouflage uniform including the first camouflage uniform portion and the camouflage uniform including the second camouflage uniform portion have been manufactured using face-to-face adjacent fabric plies within a stack of fabric plies. That is, the sides of two adjacent fabric plies that have a camouflage pattern on them, which are referred to as the camouflage faces of these plies, face one another within the fabric ply stack. Thereafter, such fabric plies are cut and sewn together to make the camouflage uniforms. This parameter also has been described in the previous section of the detailed description, and has been referenced as double-sided spreading.

By comparison, a fourth parameter is a supposition that the camouflage uniform including the first camouflage uniform portion and the camouflage uniform including the second camouflage uniform portion have been manufactured using fabric plies that have their camouflage faces also oriented the same way (i.e., up or down) within a stack of fabric plies. That is, the sides of two adjacent fabric plies that have a camouflage pattern on them, which are referred to as the camouflage faces of these plies, also face in the same direction. Thereafter, such fabric plies are cut and sewn together to make the camouflage uniforms. This parameter also has been described in the previous section of the detailed description, and has been referenced as single-sided spreading. It is noted that the fourth parameter is mutually exclusive with the third parameter, such that either the third parameter is employed, or the fourth parameter is employed.

A fifth parameter is the multiplicity of the master pattern from which the camouflage uniform including the second camouflage uniform portion have been manufactured, where this multiplicity is in relation to the first camouflage uniform portion. The multiplicity denotes the number of areas of the master pattern of the camouflage uniform, including the second camouflage uniform portion, that are visually similar to the first camouflage uniform portion. The multiplicity is at least one, because the areas include the second camouflage uniform portion that has been matched by the user to the first camouflage uniform portion. This parameter also has been described in the previous section of the detailed description, and has been referenced as siblings in addition to the terminology multiplicity.

Once the probability of the accidental match has been determined, it is output (108). For instance, the probability of the accidental match may be displayed on a display device for viewing by the user, or it may be printed on a hard medium like paper by a printing device, also for viewing by the user. This probability may be presented in the context of a report that summarizes the input parameters, images, as well as other data. Ultimately, the probability of accidental match may be used as evidence that is presented within a criminal court proceeding in which the suspect has been charged with being the perpetrator of the crime (110). Presenting such accidental match probability is used to at least assist in proving the guilt of the suspect in committing the crime.

For example, a forensic investigator may be called by the prosecution to testify that the suspect's camouflage uniform matches the camouflage uniform taken in a surveillance photo at the scene of the crime. To undercut the forensic investigator's testimony, the defense may cross-examine the forensic investigator and ask whether there is a chance that there is an accidental match between the two uniforms. By employing an embodiment of the invention, the forensic investigator is able to particularly specify at least the upper-bound of such an accidental match. Where the accidental match is relatively low, the jury or judge may be convinced that there is no reasonable doubt that the garment worn by an unknown individual in a surveillance image is the same as the garment taken from a suspect's personal belongings. This lends credence to the idea that the suspect is the one that committed the crime, and should thus be convicted of it. By comparison, without the invention, the forensic investigator is unlikely to be able to quantitatively and particularly specify the probability of accidental match, giving more credence to the defense's position that there is reasonable doubt that the suspect has committed the crime. This is particularly the case with camouflage uniforms, which most laypeople tend to think of as "identical" though, with sufficient resolution and study, one finds this to be untrue from a scientific perspective.

Figure 2B:
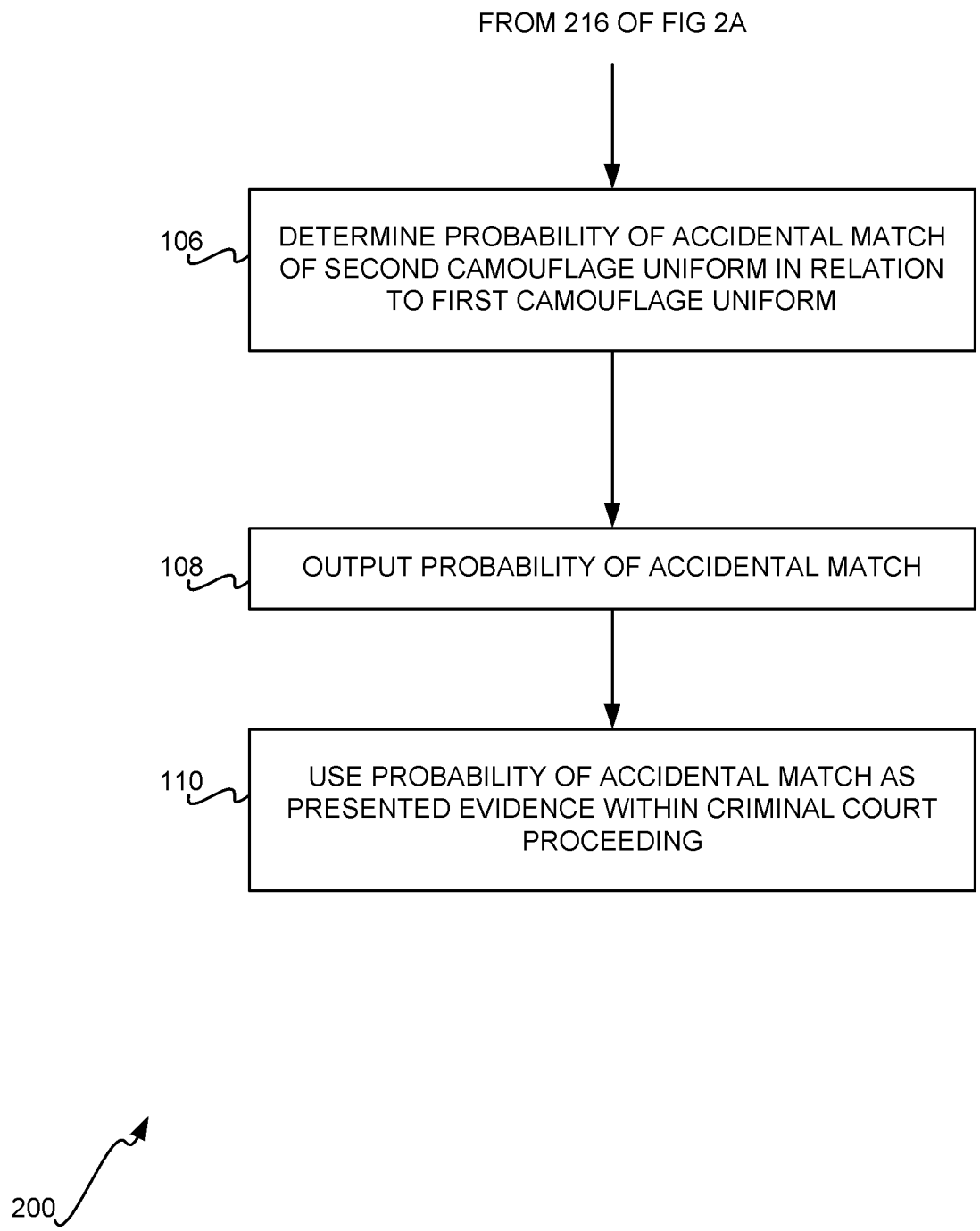

FIGS. 2A and 2B show a method 200 that is more detailed than but consistent with the method 100, according to an embodiment of the invention. A first digital image of a first camouflage uniform is received (202). The first digital image may be a digitized crime scene surveillance photo in which a perpetrator of a crime is wearing the first camouflage uniform.

A user is enabled or permitted to identify one or more first camouflage uniform portions within the first camouflage uniform (204). A user interface may be presented to the user of the first digital image, for instance. As such, the user is permitted to draw or otherwise select boundaries within the displayed first camouflage uniform to select the first camouflage uniform portion. As noted above, the user may be an expert user in camouflage uniform portion matching, such as a forensic investigator. The first camouflage uniform portions that the user identifies are those that he or she believes match one or more corresponding second uniform portions of a second camouflage uniform.

Thus, the user has identified the first camouflage uniform portions as matching one or more corresponding second camouflage uniform portions of the second camouflage uniform. The second camouflage uniform may be that which has been seized from a suspect of the crime. The user may, for instance, directly examine a recovered uniform garment, or may examine an image—like a digital image—of this second camouflage uniform. Such an image or images may be created by photographing the recovered uniform garment in a laboratory or other locale, for instance.

Information regarding the camouflage uniform manufacturing process, of at least the second camouflage uniform, is received (206). Such information is received to assist in later determination of the accidental match probability. For instance, the information can include that there is at least a likelihood that the first and the second camouflage uniforms have been manufactured from the same camouflage uniform design template, or marker. Alternatively, the information can include that the first and the second camouflage uniforms are unlikely to have been manufactured from the same camouflage uniform design template, or marker.

The information can further include that the camouflage uniforms in question were at least likely manufactured using double-sided spreading (i.e., where adjacent fabric plies within the stack of plies have their camouflage faces facing one another). Alternatively, the information can further include that the camouflage uniforms were at least likely manufactured using single-sided spreading (i.e., where all the fabric plies within the stack of plies have their camouflage faces oriented in the same direction). In general, the information received may include the identification of the manufacturer of the second camouflage uniform, where the additional information noted in this paragraph is then looked up within a database of predetermined manufacturing "profiles."

Thereafter, the method 200 performs the following for each first camouflage uniform portion in question (208). The first camouflage uniform portion is displayed for viewing by the user (210). A digital image of a master camouflage uniform pattern is then blurred (212). The master camouflage uniform pattern is the pattern from which the second camouflage uniform, and presumably from which the first camouflage uniform, were manufactured. The master camouflage uniform pattern is leveraged by the model in determining the probability of accidental match between the first and the second camouflage uniforms. The insight here is to locate within the master camouflage uniform pattern any other regions that match the first camouflage uniform portions that the forensic expert has already matched to the second camouflage uniform portions—that is, other "sibling" areas as has been described above. The greater the number of such additional master camouflage uniform pattern regions that match the first camouflage uniform portion in question, the greater the probability of accidental match between the first and second camouflage uniforms.

Therefore, to assist the method 200 and/or the user in locating additional regions within the master camouflage uniform pattern that match the first camouflage uniform portion in question, the master camouflage uniform pattern is artificially blurred in part 212 to match the blurriness of the digital image of the first camouflage uniform. For example, the user may be permitted to select a blurring value on which basis the master pattern is blurred and then displayed to the user. The blurred master camouflage uniform pattern digital image may be displayed alongside the first digital image (or the first camouflage uniform portion that has been selected), so that the user can visually assess whether the master camouflage uniform pattern has been appropriately blurred. As such, the user can iteratively modify the blurring value and then see the results of the blurring until the user is satisfied that the master camouflage uniform pattern at least substantially matches the blurriness of the first camouflage uniform within the first digital image. The impetus for blurring the master pattern is to ensure that, when searching for "sibling" regions that also match the identified matching portions, the increased number of (sibling) areas that appear visually identical due to blur in surveillance photographs is appropriately determined and passed on to the statistical model.

The method 200 then determines one or more regions (if any) of the master camouflage uniform pattern that are visually similar to the first camouflage uniform portion in question (214). It is noted that this determination can be performed in one of two different ways. First, the user him or herself may be permitted to identify these additional regions. For instance, the user may be permitted to manually identify these regions on the blurred master camouflage uniform pattern using on-screen "paint" tools, where such tools may also have been initially used to specify the portions on the first digital image. Second, the method 200 itself may analyze the master camouflage uniform pattern for regions thereof that are visually similar to the first camouflage uniform portion in question, using appropriate image-matching algorithms, as can be appreciated by those of ordinary skill within the art.

For each such additional region, the region is displayed, and the user is permitted to confirm (or reject) the visual similarity of the region to the first camouflage uniform portion (216). For instance, the first camouflage uniform portion may be displayed (as in part 210), and each additional region within the master camouflage uniform pattern successively displayed next to the first camouflage uniform portion in question. The user is then permitted or enabled to approve the region currently being displayed as being visually similar to the first camouflage uniform portion in question, or to reject the visual similarity of the region currently being displayed to the first camouflage uniform portion in question. The user-approved "confirmed" regions are thus the siblings, and the number of these additional visually similar regions (plus one, for the base match) is equal to the multiplicity.

Thereafter, the probability of accidental match of the second camouflage uniform in relation to the first camouflage uniform is determined by using a statistical model (106), based on one or more parameters and based on analyses of the first and the second camouflage uniform portions. As has been described, these parameters can include whether there has been double-sided or single-sided spreading, information regarding which has been received in part 206. As has also been described, these parameters can include whether identical markers or independent markers have been employed, information regarding which has also been received in part 206. As has also been described, the parameters can include the multiplicity, which has been determined in part 208.

Once the probability of accidental match of the second camouflage uniform in relation to the first camouflage uniform has been determined, such as by using the statistical model described in the preceding section of the detailed description, the probability of accidental match is output (108). Such output can include displaying the accidental match probability on a display device, and/or printing this probability using a printing device. Ultimately, the probability of accidental match can be used as presented evidence within a criminal court proceeding (110), as has been described above.

Embodiments of the invention are thus advantageous over the prior art. While a user, such as a skilled forensic examiner, inputs a qualitative match between camouflage uniform portions of two digital images of camouflage uniforms, or that of a qualitative match between camouflage uniform portions of one digital image and one physical garment, embodiments of the invention output the quantitative probability of accidental match. Thus information can then be used for a variety of purposes, such as in legal proceedings.

Computerized System

Figure 3:
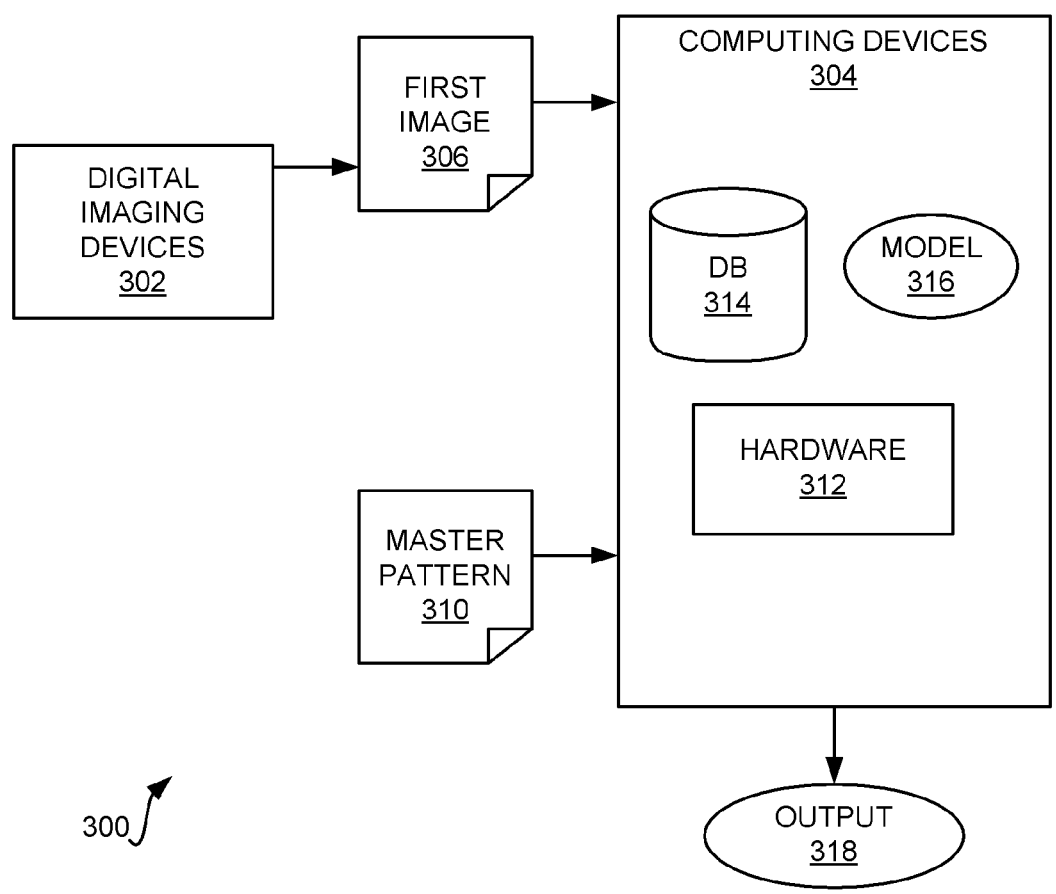
FIG. 3 is a diagram of a computerized system, according to an embodiment of the invention.

FIG. 3 shows a computerized system 300, according to an embodiment of the invention. The system 300 includes one or more digital imaging devices 302 and one or more computing devices 304. The digital imaging devices 302 can include digital camera devices, digital scanning devices, and other types of digital imaging devices. The digital imaging devices 302 output a first image 306, as has been described above. This image 306 is input into the computing devices 304. That is, the digital imaging devices 302 are communicatively coupled to the computing devices 304 in some manner.

The computing devices 304 also can receive a digital image of a master pattern 310 of the second camouflage uniform, as has been described above. The computing devices 304 include hardware 312, such as memory, processors, storage devices, and so on. The hardware 312 is specifically programmed to implement a model 316 for determining the probability of accidental match between the first and the second camouflage uniforms. In this respect, the hardware 312 is programmed to perform the methods that have been described in the previous sections of the detailed description. The methods and the model 316 may employ a database 314 that stores information regarding how manufacturers makes camouflage uniforms, to set one or more of the parameters of the model 316 that have been described above. The methods provide the ability to input data concerning the uniforms, images, manufacturer, and other salient information.

On this basis, the computing devices 304 provide output 318. The output 318 may be a printed report or information displayed on a display device that is part of the hardware 312 of the computing devices 304. The output 318 specifically includes the output of the model 316, and thus the probability of accidental match between the first and the second camouflage uniforms, as has been described above.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

For example, the camouflage uniform is more generally a camouflage garment, which is itself more generally a garment. The digital image in question may be a still image or a frame of a video. The digital image may be surreptitiously taken from a person wearing the first garment, or voluntarily taken (i.e., with permission from the person). The first garment appears in the digital image within an environment. This environment may be a crime scene, a group photo, or another type of environment. The digital image of the first garment may be taken from a crime scene in which a perpetrator of a crime wore the first garment. As such, the second garment may be taken from the suspect of the crime.

The second garment may be recovered from a person presumed to be the same person wearing the first garment in the digital image. The second garment may appear in a second digital image different than the digital image of the first garment. This second digital image may also be surreptitiously or voluntarily taken of the person wearing the second garment, and the second garment may appear in the digital image within an environment, such as a group photo, or a controlled laboratory environment in which the second garment is photographed after seizure from the owner (e.g., the wearer) of the second garment.

We claim:

1. A non-transitory computer-readable storage medium having one or more computer programs stored thereon for execution by one or more computing devices, such that execution of the computer programs by the computing devices cause performance of a method comprising:

receiving a digital image of a first garment having one or more first garment portions, a user having identified the first garment portions as matching one or more corresponding second garment portions of a second garment;

determining a probability of accidental match of the first garment within the digital image in relation to the second garment, by using a statistical model based on one or more parameters and based on analyses of the first garment portions; and outputting the probability of accidental match, wherein the parameters comprise one of:

a supposition that the garment including the first garment portions and the garment including the second garment portions have been manufactured using a same garment design template in that the same garment design template has been used to guide cutting of raw patterned fabric that was then sewn together to make the garments, such that the same garment design template is a template in that the same garment design template guides how the raw patterned fabric is to be cut;

a supposition that the garment including the first garment portions and the garment including the second garment portions have been manufactured using different garment design templates in that the different garment design templates have been used to guide cutting of raw patterned fabric that was then sewn to ether to make the garments, such that the different garment design templates are each a template in that the different garment design templates each guide how the raw patterned fabric is to be cut;

a supposition that the garment including the first garment portions and the garment including the second garment portions have been manufactured using face-to-face adjacent fabric plies within a stack of fabric plies, in which pattern faces of the adjacent fabric lies face one another, that are cut and then sewn together to make the garments;

a multiplicity of the garment including the second garment portions in relation to the first garment portion, the multiplicity denoting a number of areas of the garment including the second garments portion that are visually similar to the first garment portions, the areas including the second garment portions;

a supposition that strict ply integrity has been maintained during the manufacture of the garments, where strict ply integrity means that at least medium and large pieces of a garment are made from a common ply of fabric, such that the medium pieces of the garment are pieces having first sizes greater than a predetermined size, and the large pieces of the garment are pieces having second sizes larger than the first sizes.

2. The non-transitory computer-readable storage medium of claim 1, wherein the digital image is one of a still image or a frame of a video.

3. The non-transitory computer-readable storage medium of claim 1, wherein the digital image is one of surreptitiously taken or voluntarily taken of a person wearing the first garment.

4. The non-transitory computer-readable storage medium of claim 1, wherein the first garment appears in the digital image within an environment, the environment comprising one of a crime scene or a group photo.

5. The non-transitory computer-readable storage medium of claim 1, wherein the second garment is recovered from a person presumed to be a same person wearing the first garment in the digital image.

6. The non-transitory computer-readable storage medium of claim 1, wherein the digital image is a first digital image, and the second garment appears in a second digital image different than the first digital image, the second digital image being one of a still image or a frame of a video, the second digital image being one of surreptitiously taken and voluntarily taken of a person wearing the second garment, the second garment appearing in the digital image within an environment, the environment comprising one of a group photo and a controlled laboratory environment.

7. The non-transitory computer-readable storage medium of claim 1, wherein the digital image is taken from a crime scene in which a perpetrator of a crime wore the first garment.

8. The non-transitory computer-readable storage medium of claim 7, wherein the second garment is taken from a suspect of the crime.

9. The non-transitory computer-readable storage medium of claim 1, wherein outputting the probability of accidental match comprises displaying the probability of accidental match on a display device.

10. The non-transitory computer-readable storage medium of claim 1, wherein the first and the second garments are made of a material having a repeating pattern.

11. The non-transitory computer-readable storage medium of claim 1, wherein the first and the second garments are camouflage uniforms.

12. The non-transitory computer-readable storage medium of claim 1, wherein the first and the second garments are military camouflage uniforms.

13. The non-transitory computer-readable storage medium of claim 1, wherein the first and the second garments are types of garments manufactured in multiple factories according to identical specifications.

14. A system comprising:
one or more computing devices; and,
hardware of the computing devices, the hardware programmed to:
receive a first digital image of a first camouflage garment;
enable a user to identify one or more first camouflage garment portions within the first camouflage garment, the user having identified the first camouflage garment portions as matching one or more corresponding second camouflage garment portions of a second camouflage garment;
determine a probability of accidental match of the first camouflage garment in relation to the second camouflage garment, by using a statistical model based on one or more parameters and based on analyses of the first camouflage garment portions; and
output the probability of accidental match,
wherein the hardware is further programmed to, after the first digital image has been received, and after the user has identified the first camouflage garment portions, for each first camouflage garment portion,
blur a master camouflage garment pattern to at least substantially match a blurriness of the first camouflage garment portion within the first digital image;
determine one or more regions of the master camouflage garment pattern that are visually similar to the first camouflage garment portion;
for each region of the master camouflage garment pattern that has been determined,
display the region;
permit a user to confirm visual similarity of the region to the first camouflage garment portion.

15. The system of claim 14, further comprising one or more digital imaging devices by which the computing devices receive the first digital image.

16. The system of claim 14, wherein the parameters comprise a multiplicity for each first camouflage garment portion, the multiplicity equal in number to a number of the regions of the master camouflage garment pattern that have been confirmed as being visually similar to the first camouflage garment portion, plus a number of the second camouflage garment portions corresponding to the first camouflage garment portion.

17. The system of claim 14, wherein the hardware is to determine the regions of the master camouflage garment pattern that are visually similar to the first camouflage garment portion by permitting a user to identify the regions.

18. The system of claim 14, wherein the hardware is to determine the regions of the master camouflage garment pattern that are visually similar to the first camouflage garment portion without user interaction.

19. A system comprising:
one or more computing devices; and,
hardware of the computing devices, the hardware programmed to:
receive a first digital image of a first camouflage garment;
enable a user to identify one or more first camouflage garment portions within the first camouflage garment, the user having identified the first camouflage garment portions as matching one or more corresponding second camouflage garment portions of a second camouflage garment;
determine a probability of accidental match of the first camouflage garment in relation to the second camouflage garment, by using a statistical model based on one or more parameters and based on analyses of the first camouflage garment portions; and,
output the probability of accidental match,
wherein the hardware is further programmed to receive information regarding a manufacturing process of at least the second camouflage garment, the information used in determining a probability of accidental match of the first camouflage garment in relation to the second camouflage garment.

20. The system of claim 19, wherein the information comprises that the first camouflage garment and the second camouflage garment have at least likely been manufactured using a same camouflage garment design template in that the same camouflage garment design template has been used to guide cutting of raw camouflage fabric that was then sewn together to make the first and the second camouflage garments, such that the parameters comprise that the first camouflage garment and the second camouflage garment have been manufactured using the same camouflage garment design template,
wherein the same garment design template is a template in that the same garment design template guides how the raw patterned fabric is to be cut.

21. The system of claim 19, wherein the information comprises that the first camouflage garment and the second camouflage garment have at least likely been manufactured using different camouflage garment design templates in that the different camouflage garment design templates have been used to guide cutting of raw camouflage fabric that was then sewn together to make the first and the second camouflage garments,
such that the parameters comprise that the first camouflage garment and the second camouflage garment have been manufactured using different camouflage garment design templates,
wherein the different garment design templates are each a template in that the different garment design templates each guide how the raw patterned fabric is to be cut.

22. The system of claim 19, wherein the information comprises that the first camouflage garment and the second camouflage garment have at least likely been manufactured using face-to-face adjacent fabric plies within a stack of fabric plies, in which camouflage faces of the adjacent fabric plies face one another, that are cut and then sewn together to make the first and the second camouflage garments,
such that the parameters comprise that the first camouflage garment and the second camouflage garment have been manufactured using face-to-face adjacent fabric plies within the stack of fabric plies.

* * * * *